United States Patent [19]

Heidrich

[11] 4,168,582
[45] Sep. 25, 1979

[54] RADAR TERRAIN SIGNAL SIMULATOR

[75] Inventor: Arthur J. Heidrich, South Daytona, Fla.

[73] Assignee: General Electric Company, Fairfield, Conn.

[21] Appl. No.: 652,286

[22] Filed: Jan. 26, 1976

Related U.S. Application Data

[63] Continuation of Ser. No. 464,928, Apr. 29, 1974, abandoned.

[51] Int. Cl.² ............................ G01S 9/00; G11C 19/00
[52] U.S. Cl. ................................. 35/10.4; 307/221 R; 328/37
[58] Field of Search ............................ 35/10.4; 328/37; 307/221 R

[56] References Cited

U.S. PATENT DOCUMENTS

| | | | |
|---|---|---|---|
| 3,069,657 | 12/1962 | Green, Jr. et al. | 307/221 R X |
| 3,535,642 | 10/1970 | Perlman | 307/221 R X |
| 3,700,780 | 10/1972 | Roeschelein | 35/10.4 |
| 3,718,863 | 2/1973 | Perlman | 328/37 |
| 3,742,381 | 6/1973 | Hurd | 328/37 X |
| 3,766,316 | 10/1973 | Hoffman et al. | 328/37 X |
| 3,783,172 | 1/1974 | Bernstein | 35/10.4 |
| 3,800,440 | 4/1974 | Membrino et al. | 35/10.4 |
| 3,829,596 | 8/1974 | Murphree | 35/10.4 |

Primary Examiner—Malcolm F. Hubler
Attorney, Agent, or Firm—Allen E. Amgott

[57] ABSTRACT

To simulate the radar return from terrain of particular generic type (e.g. desert, forest, cultivated land) it is a known suggestion to employ closed-loop shift register with feedback suitable to produce particular "texture" of return from specified terrain. It is here disclosed to synchronize output of such register with azimuthal position of simulated search radar; but this alone gives "grainy" effect because "smeary" or slowly changing amplitude with range in PPI sweep is not matched by corresponding lateral, or azimuthal, "smear". This objectionable effect is overcome by providing three sets of output terminals on feedback register, giving outputs corresponding to shifts for azimuths N, N+1, and N+2. By buffing together the three outputs, an azimuthal variation at a slow rate, comparable with the variation with range, is obtained, giving a more deceptive (and thus better) simulation.

3 Claims, 5 Drawing Figures

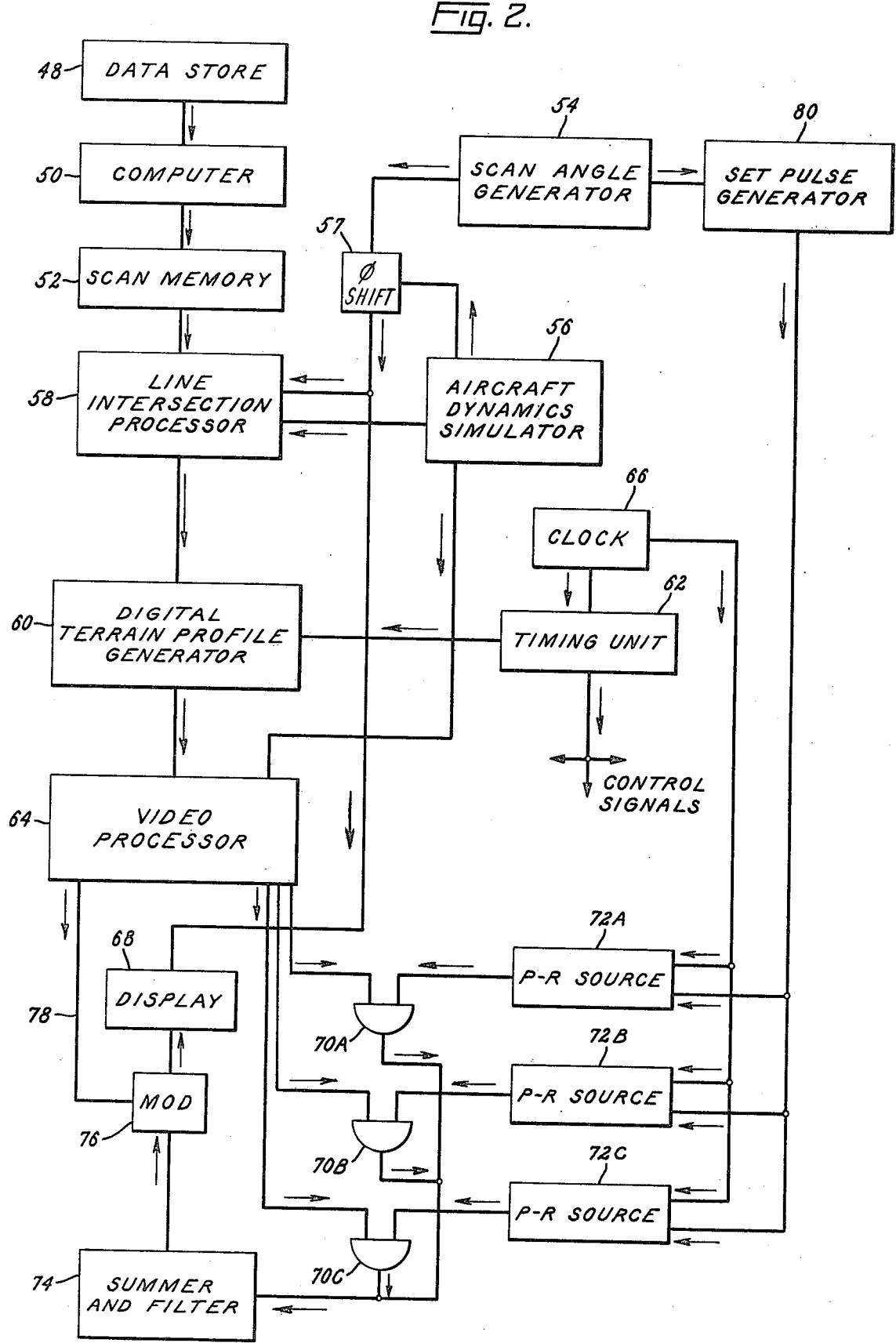

RADAR TERRAIN SIGNAL SIMULATOR

This is a continuation, of application Ser. No. 464,928, filed Apr. 29, 1974, now abandoned.

BACKGROUND OF THE INVENTION (1) Field of the Invention

This invention pertains to the field of radar simulators.

(2) Description of the Prior Art

Probably the oldest and most remotely related prior art is the acoustic water-tank trainer in which a modification of sonar equipment was used to scan submerged models of terrain. The difference in propagation speed between electromagnetic radiation in air and sound in water provided a reasonable scale factor, and war-inspired ingenuity led to such novelties as the use of powdered effervescent digestant tablets to simulate chaff or window by their bubbles. The device was clumsy in dimensions and inflexible in that terrain representations had to be modeled physically. Somewhat simpler in that the terrain is simulated by transparencies, and so may be produced and replaced economically, and need not be inconveniently large, is the system employing e.g. flying-spot scanners, of which U.S. Pat. No. 3,355, 538 of Thomas et al. is an example.

U.S. Pat. No. 3,446,903 of B. Beizer discloses a radar trainer relying upon data stored digitally, as in a magnetic tape, drum, or disk store which is converted into a scope representation. Beizer mentions at his column 4, lines 14 and 15 that weather noise may be represented by a simple random noise signal insertion.

U.S. Pat. No. 3,514,521, Burchard et al. discloses a radar trainer intended primarily to train marine navigators, and so having fixed targets defined completely by stored data.

Warnock, U.S. Pat. No. 3,602,702; Romney et al., U.S. Pat. No. 3,621,214; and Erdahl et al., U.S. Pat. No. 3,665,408 teach means for presenting visual perspective representations of objects described by stored numbers; and they teach adjustment of the illumination of faces of such objects according to some assumed mode of illumination. However, they aim at representing an object viewed by the eyes; so they do not encounter the problem that the reflective characteristics of a surface must be simulated canonically; any geometrical features of a surface in their images must be described in detail, quite literally "by the numbers".

Thompson, U.S. Pat. No. 3,550,407, describes a means of simulating ground clutter for testing of airborne moving-target-indicating radar systems on the ground. It has no pertinence to the present invention.

U.S. Pat. No. 3,700,780, Roeschlein, is aimed at testing sonar devices by providing (column 1, lines 48 et seq.)" . . . a plurality of single bit outputs of different delays to simulate a received sonar wavefront from a simulated target relative to the sonar receiver."

Heartz, U.S. Pat. No. 3,769,442, while not directly pertinent to the present invention, is of interest in the general field of computer generation of images.

U.S. Pat. No. 3,783,172, of Bernstein, discloses a radar simulator in which target data on a particular bearing are entered into a register in order of increasing range from the radar set, and are then read out and converted into video signals to drive a radar set.

U.S. Pat. No. 3,800,440 of Membrino et al. discloses a simulator of conventional IFF signals. It uses shift registers for this prupose, and applies the IFF simulations to a radar set.

In summary, none of the prior art known to the applicant teaches the use of fedback shift register outputs representing a plurality of successively timed outputs, displaced in time to be simultaneous, to provide characteristic "texture" of radar returns for given kinds of terrain.

SUMMARY OF THE INVENTION

A shift-register is provided, with feedback which will provide a pseudo-random output that simulates the appearance of radar returns from given terrain, when fed clock pulses of suitable frequency. By "pseudo-random" is meant an output which is actually cyclically repetitive, but has a period sufficiently long that its repetitive parts will be sufficiently separated in space or in time so that an observer will not become aware of their repetitive nature by casual observation.

(Because the term "feedback" as an adjective has acquired a number of somewhat different meanings in the art, a register as described will be designated a fedback register.)

The apparatus in which the present invention is principally intended to be used is a simulator comprising a store of data which includes peak and valley lines of the terrain whose radar image is to be simulated, together with indication of the radar reflectivity of the various surfaces of the terrain, and an identification of the nature of the terrain. A plan position indicator (PPI) presentation device is provided, with means to produce a sweep in range from an origin representing the location of the radar system being simulated. By data processing equipment the intensity of the radar return from each part of the simulated terrain is calculated, and the presentation is illuminated correspondingly. However, as a matter of economy, it is undesirable to store terrain data in such volume as would be required to simulate the particular texture of return which the skilled operator would recognize as a characterizing a particular kind of terrain, such as woodland, cultivated land, and the like. The pseudo-random output of the feedback shift register is applied to modulate the brightness of the sweep, producing an irregularity consistent with the particular terrain being represented. The appropriate pseudo-random output may be gated in accordance with the stored identity of the kind of terrain; different such outputs may be produced from separate fedback shift registers, having different feedback paths; or the feedback paths of a single shift register may be altered by gating. The particular pattern of a single register may also be stretched or compressed by decreasing or increasing the stepping pulse frequency applied to it. Another alternative is to divide the outputs of a given fedback register to produce a different pseudo-random sequence differing particularly in having lower maximum frequency components. However, the economical availability of integrated circuits containing large numbers of register stages in very small compass renders the use of separate registers feasible as to cost, and has the advantage of permitting complete flexibility in the choice of pseudo-random patterns.

In the simulator described, the radar will be considered to be scanning cyclically in azimuth, either circularly or in sector scan, at a rate such that if the pseudo-random modulation is not synchronized with the azimuth position of the scan—that is, if it does not follow the same pattern at a given azimuth in successive revolutions of the hypothetical radar antenna—there will appear to be a crawl or flicker of the returns intended to simulate a fixed terrain. This is obviously destructive of the illusion sought. Therefore the fedback register must be synchronized in some manner with the azimuth scan. This is done by setting the register stages to some reference state at the completion of each azimuth scan cycle which, for circular scan, will be at each full circle of 360 degrees.

This procedure will result in a terrain texture pattern which will appear fixed with reference to the terrain boundaries; but it will have a high probability of appearing unrealistically "grainy" in that light or dark streaks which are a number of resolution elements long in range will be only as wide as the simulated beam width, and may produce an impression of a terrain which has been "combed" in the direction of the range, with less continuity of texture in azimuth than it has in range. This is overcome in my invention by providing for each fedback register a plurality of output terminals giving outputs corresponding to $f(N)$, $f(N+1)$, $f(N+2)$, and so forth, where "N" is the azimuth ordinal number of a given sweep. These plural outputs may be buffed or mixed together so that for a single sweep at a given azimuth, there will be mixed the register outputs corresponding to that azimuth and the next two successive azimuth positions of the beam. Thus successive sweeps at successive azimuth positions will be blended or "smeared" and the graininess will be eliminated. This approach permits great flexibility in producing desired patterns; not only may the number of outputs in the plurality be altered at will, but the contribution of each may be adjusted by variously attenuating the outputs from the various terminals. Thus the contribution from the $f(N+2)$ terminal may be diminished relative to that from the $f(N+1)$ terminal, which latter in turn may be diminished relative to that from the $f(N)$ terminal. Thus a given pattern from the fedback shift register will be introduced at a low level into a beam pattern, will appear at a higher level in the next beam, and reach a maximum in the third beam. Alternatively, it may be introduced attenuated in a first beam, reach a maximum in the next, and then appear attenuated in the third.

The net effect of these two improvements, the synchronization of the register output with the azimuth scan, and the blending of the patterns for several successive sweeps at adjacent azimuths, is to provide means for almost completely arbitrary selection of the appearance of the simulated return from a given kind of terrain.

BRIEF DESCRIPTION OF THE DRAWINGS

FIG. 2 represents a simulator embodying the invention.

DESCRIPTION OF THE PREFERRED EMBODIMENT

Figure 1:
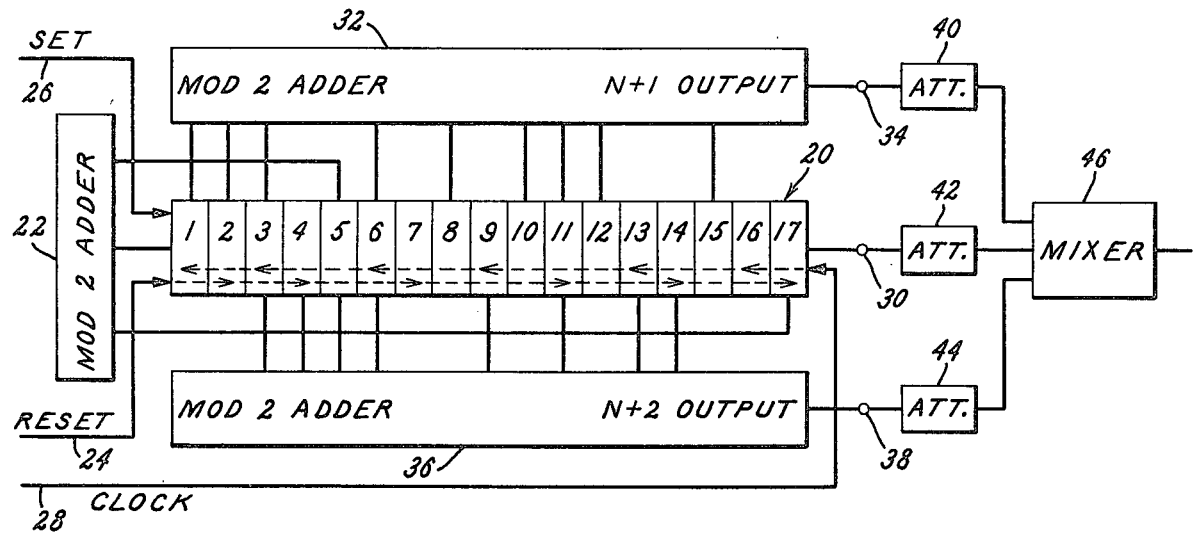
FIG. 1 represents a fedback counter circuit in a form applicable to the practice of the invention.

FIG. 1 represents a shift register 20, whose seventeen individual stages are numbered from 1 to 17, the outputs of stages 5 and 17 being connected as inputs to modulo 2 adder 22, whose output is fed back into stage 1. A zero set line 24 is represented, by its dashed continuation through stages 1 through 17, as affecting all the stages, causing them to be set to zero responsively to a pulse applied to zero set line 24. If this operation is performed, and is followed by the application of a set pulse to one set line 26, which affects only stage 1, there will be a "one" in stage 1, and "zeroes" in all the other stages. Since the purpose of the zero set and one set operations is to adjust the register to a reference state, the operation may be described as setting. Clock pulses applied by clock line 28 whose dashed continuation indicates that it affects all the stages, in the conventional manner of operating shift registers, will then cause the contents of stage one to be shifted toward stage 17, where it will appear at terminal 30. However, when a "one" passes through stage 5, it will be fed to modulo 2 adder 22, which will then feed another "one" into stage 1, and similarly when a "one" passes through stage 17; but in accordance with the known definition of the properties of a modulo 2 adder, the simultaneous passing of "one" through stages 5 and 17 will produce no output from adder 22. The net effect of the feedback arrangement shown is to produce an output at terminal 30 which, when converted to analogue form, will suitably simulate the characteristics of the radar return from farmland. The general theory of feedback shift registers appears in "Error-Correcting Codes" by William Wesley Peterson and E. J. Weldon, Jr., second edition, 1972, Library of Congress catalog card number 76-122262, the MIT Press, Cambridge, Massachusetts, pages 182 to 188, section 7.4 entitled "Linear Recurrence Relations and Shift-Register Generators".

Modulo 2 adder 32 has inputs connected to stages 1, 2, 3, 6, 8, 10, 11, 12, 15, and its output appears at terminal 34. The signal appearing at terminal 34 is a prediction of the output which will appear on terminal 30 during the next range sweep of the radar being simulated. Therefore modulo 2 adder 32 is additionally labeled "N+1 OUTPUT". A similar modulo 2 adder 36 has as inputs the outputs of stages 3, 4, 5, 6, 9, 11, 13, and 14 of register 20; and its output at terminal 38 is predictive of the output which will appear on terminal 30 during the second next range sweep of the radar being simulated, in consequence of which it is additionally labeled "N+2 OUTPUT". The general theory of the connection of such modulo 2 adders to fedback shift registers to produce time-phase displacements and so serve as prediction means is taught in IEEE Transactions on Electronic Computers, June 1967, pages 357 through 359. under the title "Computation of Time-Phase Displacements of Binary Linear Sequence Generators" by L. E. Colley.

Purely for assistance in explanation it is represented that output terminals 34, 30, and 38 are connected, respectively, to attenuators 40, 42, and 44, whose outputs are connected to a mixer 46. An equivalent of this connection may be produced by other apparatus configurations.

If the output at terminal 30 is described as $f(N)$, that at terminal 34 as $f(N+1)$ and at terminal 38 as $f(N+2)$, where N is the ordinal number of a range sweep, the attenuations produced by attenuators 40, 42, and 44 may be so adjusted that the normalized sum of their outputs produced by mixer 46 will be expressible as $\frac{1}{2}f(N)+f(N+1)+\frac{1}{2}f(N+2)$. For the next range sweep, at azimuth $N+1$, this will be $\frac{1}{2}f(N+1)+f(N+2)+\frac{1}{2}f(N+3)$, and for the next range sweep at azimuth $N+2$, it will be $\frac{1}{2}f(N+2)+f(N+3)+\frac{1}{2}f(N+4)$. Consideration of f(N+2) in these three successive range sweeps at three successive adjacent azimuth positions shows that this signal is at half amplitude in the first sweep, at full amplitude in the second, and at half amplitude in the third. Thus this particular component rises to a maximum from a lower value and then decreases from the maximum back to a lower value in three successive range sweeps. It is evident that each successive f(N+x) will similarly rise and fall as the azimuth changes. Thus the amplitude sequence represented by a given f(N), instead of appearing sharply delineated in a single range sweep, will be faired in. The net result is that the resulting visual presentation will have a more realistically continuous appearance in azimuth to match its appearance in range. The general idea here presented is, of course, not confined to the use of three signals, since it is possible to add more adders similar to 32 and 36, to produce f(N+x) for x greater than 2, and cause a given output to be mixed at various attentuations for more than three successive range sweeps. This would normally be desirable only if the terrain characteristics to be simulated called for long stretches of light followed by long stretches of dark, during a given range sweep. It is also evident that there is a theoretical possibility of providing a gating system to alter both the feedback paths in the basic register 20 and the connections of the various stages of 20 to the adders such as 32 and 36 to achieve a number of different sequences with a single register 20. The complexity of such a stratagem, and problems of synchronization during a complete azimuth scan, strongly militate against its use merely to avoid duplication of register 20, which by current integrated circuit techniques is relatively cheap; the possibility is mentioned only for completeness, and is by no means preferred.

I may employ separate registers, feedback connections, and modulo 2 adders such as 32 and 36 for output prediction, for each terrain kind to be simulated. The clock frequency applied via clock line 28 may be adjusted to assist in the production of the desired simulation, although it should be observed that the number of stages in register 20 may be multiplied by an integer K which will permit operation at K times the nominal clock frequency. In such case the identifying numbers of the stages indicated as connected to the adders 22, 32, and 36 must also be multiplied by K to preserve the proper phase relations. This particular scheme can permit the use of a single high clock frequency instead of a plurality of clock frequencies including some lower ones.

The following table indicates four types of terrain, and the clock frequency, the number of shift register stages, the identification numbers of the stages connected to feed back in the shift register, and the identification numbers of the stages connected to modulo 2 adders to produce f(N+1) and f(N+2).

| Terrain Type | Clock Frequency | No. of SR Stages | Feedback Stages | Stage Numbers for Code Advance | |
|---|---|---|---|---|---|
| | | | | f(N + 1) | f(N + 2) |
| Farmland | 100 KHz | 19 | 19,5, 21 | 3,4,5, 6,8,9, 13,14, 17,18 | 1,3,4, 7,12, 13,14, 18 |
| Mountains & Deserts | 400 KHz | 21 | 21,2 | 1,2,4, 9,11, 12,14, | 1,3,4, 6,7,8, 9,16, |
| Uncultivated Terrain | 800 KHz | 22 | 22,1 | 15,21 9,10, 13,15, 18,22 | 18,19 4,8, 14,17, 18,19, 20,22 |
| Cultural Area | 2 MHz | 23 | 23,5 | 1,2,3, 7,9,12, 13,19, 22 | 2,3,4, 5,6,9, 13,14, 17,18, 20,21, 22 |

The possibility also exists of providing different pseudo-random pulse patterns by dividing the pulse output of a given fedback register, most conveniently by scale-of-two counters of which a single one will divide the pulse output by two, and two in cascade will divide it by four. This method provides sequences which differ by powers of two in the average duration of dark and light strips; and further variations in effect may be produced by mixing the different outputs in desired amounts.

FIG. 2 represents a general radar land mass simulation system embodying the present invention. A data store 48 contains the ground and altitude coordinates of the end points of line segments which approximate the peaks and valleys of the terrain of interest, together with the radar reflectivity and a coded identification of the class of terrain existing on each side of a line segment defined by the end points. A general purpose computer 50 is connected to data store 48 and to scan memory 52, and is programmed to load into scan memory 52, at each complete scan in azimuth, the pertinent data from data store 48, pertinence taking account of the assumed location of the radar set and the range sweep employed. The simulation of radar scanning may be provided by a motor-driven resolver, embodied in scan angle generator 54, which produces signals representative of the sine and the cosine of the scan angle. Since the sine and cosine are required in digital form, they are provided thus by analogue to digital converters. (It would, of course, be feasible to employ purely static electronic means to provide the sine and cosine functions at the proper frequency.)

Aircraft dynamics simulator 56 comprises control means simulating aircraft controls, with circuitry to produce signals representative of the aircraft position and altitude and heading resulting from the operation of the control means. Such devices are standard in various forms of trainers, and it is only the output signals produced thereby which are germane to the present disclosure.

Since the effect of rotation of the simulated aircraft will be a phase shift in the scan angle, aircraft dynamics simulator 56 is represented connected to a phase shifter 57, which is inserted in the channel from scan angle generator 54. Other data on ground position and altitude of the simulated aircraft are fed to line intersection processor 58, which also receives phase-shifted scan angle data via phase shifter 57.

Line intersection processor 58 is a computer which, for each given azimuth position, corresponding to a single range sweep, receives the end point data from the scan memory 52, and computes the ground range and altitude of the intersection of the scan with the terrain lines defined by the end points. It also receives the terrain class codes and reflectivity data from the scan memory 52, and includes in its output the terrain class code and reflectivity data pertinent to the sweep portion lying between two intersections. These outputs are transmitted to digital terrain profile generator 60, which orders them according to increasing ground range. It then computes the increments in ground range and elevation between successive intersections, and stores these differences together with terrain class code and reflectivity data in a core memory whose address is the ground range of the pertinent intersection point.

A timing unit 62 is represented which serves to count the time intervals corresponding to range discrimination units in a range sweep, and to generate control signals for timing the operation of other units, particularly of the combination of data processing functions performed by the video processor 64. Timing unit 62 receives basic frequency control from a clock 66, whose output is counted down to the frequency appropriate to the counting rate required in timing unit 62.

Timing unit 62 has a total cycling time which corresponds to the pulse repetition frequency of the simulated radar, and may conveniently be a counter of appropriate maximum registration, with its stage outputs connected to a function table suitable to produce the signals to be described, at the times indicated for their occurrence.

Initially, the zero-range data for reflectivity, and terrain class, and the ground range and elevation increment to the first intersection are read from terrain profile generator 60 into registers in the video processor 64. The range-addressed memory of digital terrain profile generator 60 is continually addressed by timing unit 62; and when data indicating an intersection are read out, the new data are applied to update the registers in video processor 64. The simulated aircraft altitude data from aircraft dynamics simulator 56 and the digital terrain profile data from terrain profile generator 60 are processed in the video processor 64 to determine the slant range from the aircraft to the ground point designated by the ground range, and the angle of incidence of the radar beam upon the ground surface, whose slope is determined from the differential altitude data. The reflectivity is multiplied by the sine of the angle of incidence to produce an analogue signal representative of the intensity of the radar return; if the angle of incidence is negative, or if an intersection at a shorter range has been of such altitude that it would mask the ground, the returned intensity signal becomes zero, showing that the ground is in shadow at that particular range. The slant range appears as a radial deflection of the beam of display 68, which is preferably a replica of a conventional radar display. The analogue intensity signal applied to the control of the display 68 would give a line-drawing type of radar display, but would not indicate the character of the terrain. The terrain class code is decoded to provide a gating signal which is applied to one of gates 70A, 70B, 70C, etc. to gate the output of one of pseudo-random sources 72A, 72B, 72C to summer and filter 74. The output of 74 is fed to modulator 76, whose other input is the return intensity signal on conductor 78. The terrain class is simulated by the nature of the pseudo-random signal gated to the modulator 76, and the intensity of the return is controlled by the modulating amplitude which conductor 78 applies to modulator 76. The output of modulator 76 is applied to the intensity control of display 68. The azimuth angle of the deflection is controlled by the outputs of scan angle generator 54 via phase shifter 57, whose sine and cosine outputs may be modulated by the analogue amplitude of the slant range, the combination of the deflections and intensity control signal producing a simulation of a conventional plan position indicator. For simulation purposes, the ground coordinates of end points from data store 48 may be adjusted to simulate motion of the aircraft as a result of operation of the controls associated with aircraft dynamics simulator 56.

A set pulse generator 80 is represented as connected to the outputs of scan angle generator 54. Its function is to produce once each scan, at a given azimuth, a signal which sets the stages of the feedback counters of pseudo-random sources 72A, etc. to a reference state. Generator 80 may conveniently be designed to be triggered when the cosine function passes through zero and the sine function is positive. It may operate by setting all register (and any associated counter) stages to a first state and then setting them to their other state, but this is a matter of design choice. The basic object to be achieved is insurance that at each particular azimuth the fedback registers and any ancillary counters will reproduce their performance on the preceding scan. When the simulated plane is turning sharply, so that its rotation is subjectively much more recognizable than its translation—in other words, when the simulated radar picture seems to be rotating much and shifting little—it is preferable to apply the output of scan angle generator 54 directly to set pulse generator 80, so that the pseudo-random sequence pattern will appear to rotate with the terrain boundaries, just as cross-hatching on a map will rotate with the map. To compensate for translation of the simulated plane is much more complex, and not in fact necessary with usual plane speeds and radar ranges.

The description given in the preceding paragraph assumes a circularly rotating antenna of the conventional PPI type. Nearly as old, and equally well known, is the sector scan, in which the antenna rotates over an angle less than a full circle, and then reverses to scan over the same angle in the opposite direction. This is conventionally achieved in a simulator of the general kind described by driving scan angle generator 54 in such a reversing sector scan. But this creates an apparent problem in that, ideally, pseudo-random sources 72A, etc. ought to repeat their previous pseudo-random output sequences for each azimuth, but with the successive azimuths occurring in reverse order. Fortunately, it has been found that with the conditions occurring in practice an observer is not disturbed if the sequence of simulated ground clutter is not reversed when the direction of scan is reversed. Apparently the superposition of two different, but stably repetitive, patterns for two different directions of scan is not disturbing so long as there is no continual "crawl" as would occur if the pseudo-random sequence were not stable on repeated scans. Since the sector scan may happen not to include the particular azimuth value which was described as triggering pulse generator 84 (cosine function zero and sine positive), it may be preferable to have it triggered by the signal which reverses the direction of rotation of scan angle generator 54.

Figure 3:
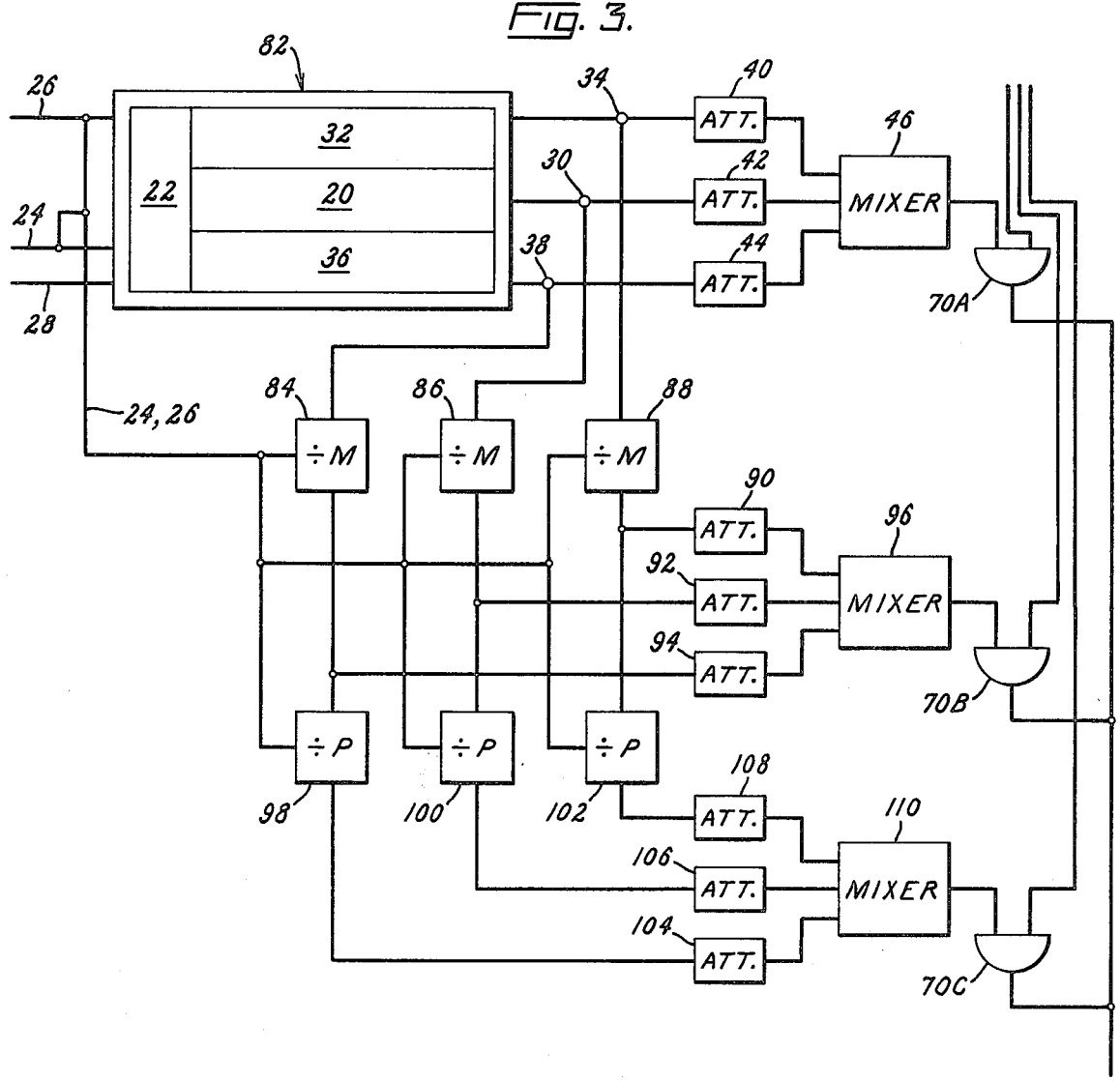
FIGS. 3 and 4 represent two different species of the invention.

FIG. 3 represents one particular way of providing pseudo-random sources, by the use of a single fedback register such as that detailed in FIG. 1, with ancillary counters to provide outputs of successively lower maximum frequencies. The interconnected reference items 20, 22, 32, and 36 of FIG. 1 are represented combined in a surrounding rectangle marked 82, with terminals 30, 34, and 38 connected respectively to attenuators 42, 40, and 44, whose outputs lead to mixer 46. The output of mixer 46 leads into gate 70A, as in FIG. 2, so that the interconnected items described are a particular embodiment of reference 72A of FIG. 2. Digital dividers 84, 86, 88 are connected to count (or divide) the outputs appearing at terminals 38, 30, and 34, respectively. While the usual convenient practice would be for these counters to count to the base two, or divide by two, in the general case they will divide by, or count to the base, M. The outputs of counters 88, 86, and 84 are connected to attenuators 90, 92, and 94, respectively, whose outputs are connected to mixer 96. The output of mixer 96 is fed as an input to gate 70B, so that mixer 96 and the components feeding into it evidently are to function as 72B of FIG. 2. For this to occur in accordance with my teaching, the output of counter 86, which counts down or divides the output of terminal 30 must correspond to the pseudo-random output sequence for the existing scan N. Since the output at terminal 30 is pseudo-random, counting it down by a constant M will evidently also produce a pseudo-random sequence having a maximum frequency component 1/M of that of the sequence at terminal 30. Reset line 24 and set line 26 are represented as combined and led to counters 84, 86, and 88, to set each to a reference state. Counter 86 may be set to any state, providing it is always the same, since it will then produce output sequences determined by, and hence as consistent as, the outputs at terminal 30. But counters 88 and 84 count the N+1 and N+2 sequences from terminals 34 and 38, respectively; and their outputs must be compatible with the output of counter 86, and with each other. The output of counter 84 must predict the output of counter 88 on the next scan; and the output of counter 88 must predict the output of counter 86 on the next scan. Since the outputs at terminals 38, 34 and 30 are so related, all that is necessary to accomplish this for the three counters 84, 86, 88 is to connect lines 24, 26 to counter 84 so that it will be set to the state that counter 86 will have at the beginning of the second scan thereafter, and to counter 88 so that it will be set to the state that counter 86 will have at the beginning of the next scan thereafter.

To provide from the same general train of equipment yet another sequence of pseudo-random outputs, three counters or dividers for dividing by P the outputs of the previous division by M are provided. Counters 98, 100 and 102 are connected to count down the outputs of counters 84, 86, and 88, respectively, and to feed attenuators 104, 106, and 108, respectively. Mixer 110 receives and mixes the outputs of attenuators 104, 106, and 108 and feeds them as an input to gate 70C. The maximum frequency component of the sequence from mixer 100 is, of course, 1/MP the maximum frequency component of the sequence from mixer 46. The considerations for resetting counters 98, 100, and 102 are precisely like those already discussed for counters 84, 86, and 88.

The clock input to 82 via channel 28 is not represented as extending to the counters, since the stepping inputs to them are timed by the outputs from terminals 30, 34, and 38. If delays in the operation of the counters render it desirable, it is well within the known art to use clock pulses to gate or otherwise time the outputs. While division by general integral parameters M and P has been described, in the simplest case these will both have a value of two.

Figure 4:
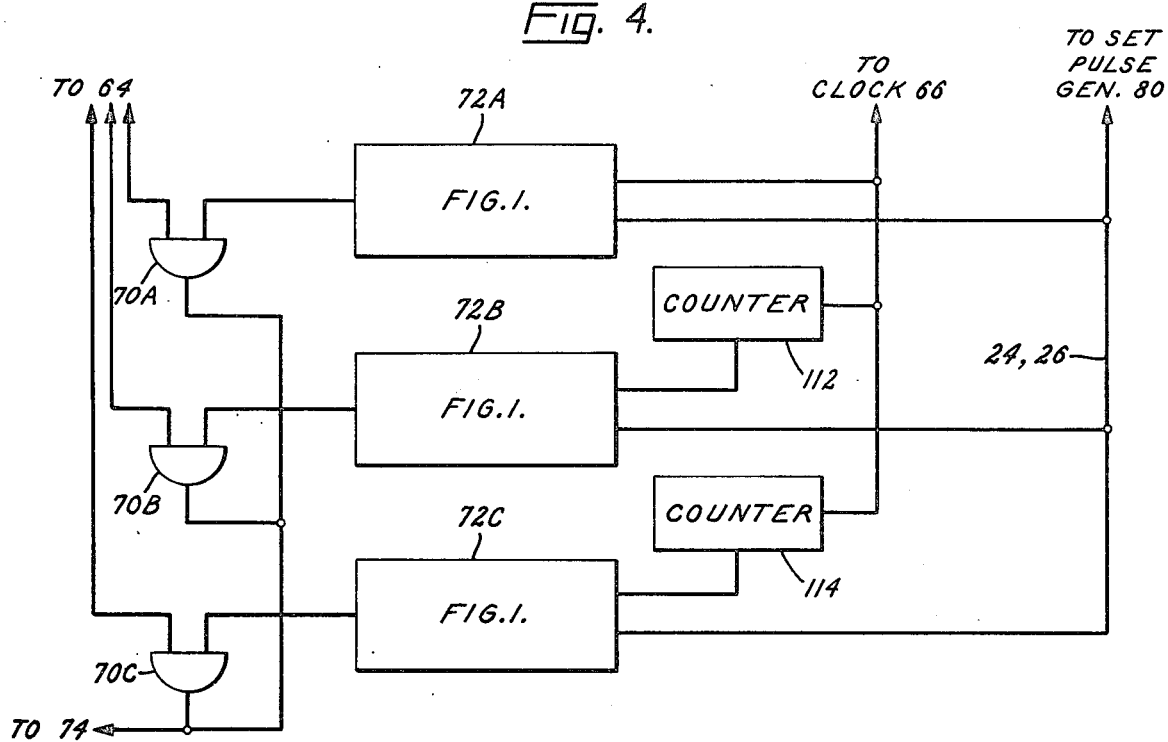

FIG. 4 represents simply a plurality of different fedback registers, 72A etc., each generally according to the embodiment of FIG. 1. Different sequences may be obtained from the different registers by employing different feedback connections; and different maximum frequencies may be obtained in the various sequences by the use of different clock frequencies; but the different clock frequencies must be synchronized with clock 66, to insure repetitiveness of the different sequences on successive azimuth scans. As a practical matter, clock 66 may contain a precision clock of the maximum frequency required, and produce lower clock frequencies by counting down from this. Thus FIG. 4 represents reference 72B fed clock impulses via a counter 112, and reference 72C fed clock impulses via a counter 114, both counters 112 and 114 receiving their controlling pulses from clock 66. The channel to set pulse generator 80 is identified as a combination of lines 24 and 26, since the representation in FIG. 1 includes the combination of two successive pulses for the setting of the register stages to a predetermined state, and the double designation preserves consistency. In fact the use of two successive pulses, or of one pulse, is determined by the designer's choice of the particular component and logic system he employs.

In FIG. 4, counters 112 and 114 may be omitted, and the configuration of the fedback shift registers in 72A, 72B, and 72C may be made to produce the different pseudo-random sequences required to simulate different terrain types, with all these components operating at the same clock frequency. Claim terminology is largely derived from the specification. Modulo-two adder means in the preamble of claim 4 are exemplified by reference 22 of FIG. 1. Set means have been clearly described; prediction means is simply the means to produce f(N+1) and f(N+2) as illustrated in FIG. 1. Mixing means are clearly so named, with associated attenuators being the devices for predetermination of amplitude relation. Counter means of claim 5 are exemplified by references 84, 86, and 88 of FIG. 3.

Figure 5:
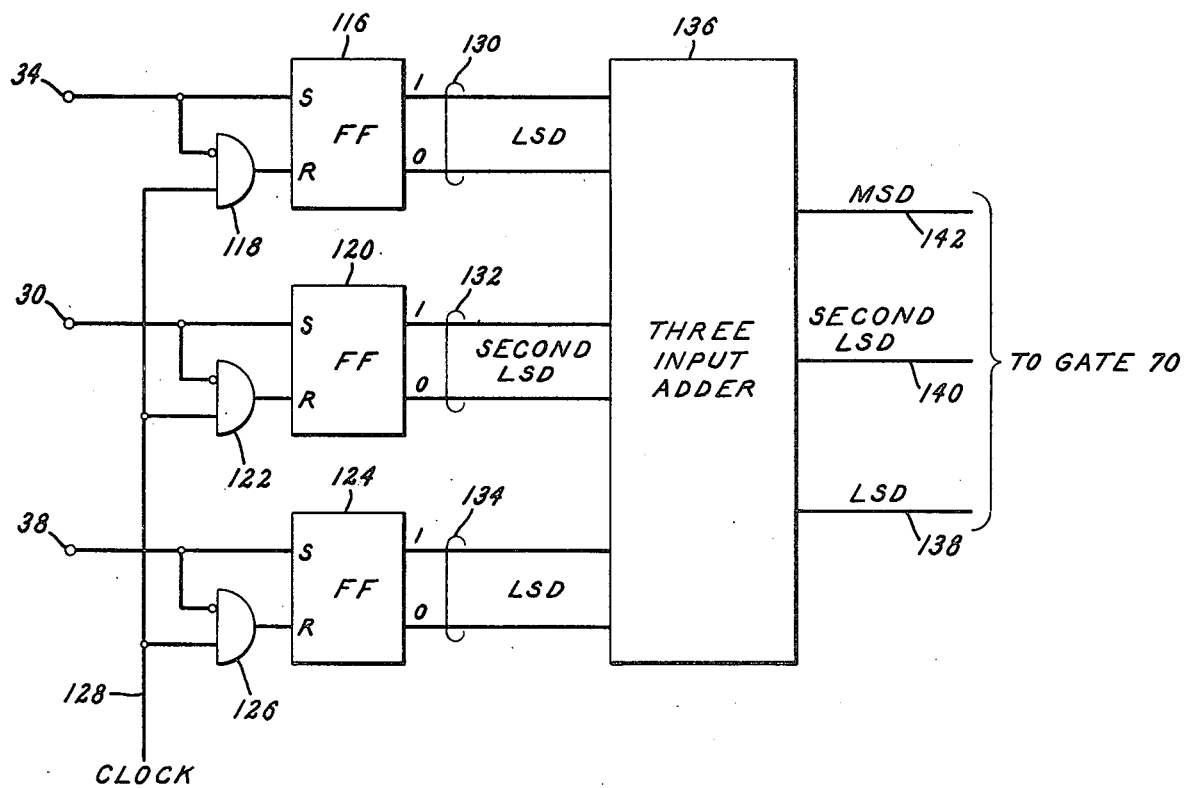
FIG. 5 represents a modification of the circuit of FIG. 1 for digital, rather than analogue, signal processing.

For simplicity of explanation, certain functions in the embodiment disclosed have been expressed in terms consistent with analogue operations. Some of these may, as a matter of design choice, be performed digitally. FIG. 5 represents an example of this, as applied to the device of FIG. 1. The terminals 34, 30, and 38 which are the outputs of adder 32, register 20, and adder 36 of FIG. 1, instead of being connected to attenuators 40, 42, and 44 as shown in FIG. 1, are connected to flipflops. Terminal 34 is connected to the set terminal S of flipflop 116, and to an inhibit terminal of gate 118, which is connected to the reset terminal R of flipflop 116. Similarly, terminal 30 is connected to the set terminal S of flipflop 120, and to the inhibit terminal of gate 122, which is connected to the reset terminal R of flipflop 120; and terminal 38 is connected to the set terminal S of flipflop 124 and to the inhibit terminal of gate 126, which is connected to the reset terminal R of flipflop 124. A clock line 128 runs to the inputs of gates 118, 122, and 126. The clock pulses on line 128 are made coincident with the output pulses at terminals 34, 30, and 38. If there is a pulse on any of these terminals, it will set its associated flipflop, and at the same time inhibit the clock pulse on line 128 from resetting that flipflop. Thus, so long as pulses continue to appear at a given terminal (34, 30, or 38) its associated flipflop (116, 120, or 124, respectively) will remain set, but the absence of the output pulse at the given terminal will remove the inhibition on its associated gate, and permit the clock pulse to reset the flipflop. The "one" and "zero" output lines 130 of flipflop 116 are marked LSD for "least significant digit". The similar output lines 132 of flipflop 120 are marked "second least significant" digit; and the output lines 134 of flipflop 124 are marked like lines 130, as least significant digit lines. These three line pairs are connected to a three-input adder 136 which treats the signals on line pairs 130 and 134 as least-significant-digit signals, and those on line pair 132 as second-least-significant-digit signals, and those on line pair 132 as a second-least-significant-digit signals, having a value twice as great as those on the other two line pairs. Thus the outputs on terminals 34 and 38 are digitally attenuated to a value one-half of that on terminal 30. If signals are present on all three of these terminals, the output of adder 136 will be the sum of 01 plus 10 plus 01, or 100, so that adder 136 must have three output lines, 138 for the least significant digit, 140 for the second least significant digit, and 142 for the most significant digit, all going to the input of a gate 70 which must, in this case, actually have three separate channels. Summer and filter 74 must, in this case, include digital-to-analogue conversion functions so that, after operating upon the incoming digital signals, it will produce at its output an analogue signal to modulator 76. In this particular instance, the individual line pairs 130, 132, and 134 may be taken as the devices for prediction of amplitude relation, and adder 136 as the mixing means.

I claim:

1. In combination with a shift register pulsed by timing pulses and fed back through modulo two adder means whose inputs are connected to outputs of various stages of the shift register and whose output is connected as an input to the shift register whereby the said fedback register is caused to produce as an output a predetermined but pseudo-random sequence of pulses simulative of the radar return from a given class of terrain, the improvement comprising:
(a) set means connected to the said fedback register to set it to a reference state responsively to a set signal;
(b) prediction means connected to the fedback register to produce, simultaneously with the output of the said fedback register, an output identical with the output which the said fedback register will produce a predetermined number of said timing pulses later than the timing pulses actually applied to the said fedback register;
(c) mixing means connected to combine the output of the said fedback register and of the said prediction means to produce a different pseudo-random signal.

2. The improvement claimed in claim 1, further comprising:
(d) counter means connected to the said fedback register and to the said prediction means and to other mixing means to produce at the output of the mixing means pseudo-random signals simulative of a class of terrain different from the class of terrain simulated by the output of the fedback register.

3. The improvement claimed in claim 1 further comprising means connected to the said fedback register, the said prediction means, and the said mixing means to predetermine the relative amplitudes of the outputs of the fedback register and the said prediction means which are combined by the mixing means.

* * * * *